United States Patent
Song et al.

(10) Patent No.: US 9,819,714 B2
(45) Date of Patent: Nov. 14, 2017

(54) METHOD AND TERMINAL FOR SHARING CONTENT

(71) Applicant: SAMSUNG ELECTRONICS CO., LTD., Suwon-si, Gyeonggi-do (KR)

(72) Inventors: Ji-young Song, Suwon-si (KR); O-hoon Kwon, Suwon-si (KR); Jong-ho Lea, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 650 days.

(21) Appl. No.: 13/733,466

(22) Filed: Jan. 3, 2013

(65) Prior Publication Data

US 2013/0173715 A1    Jul. 4, 2013

(30) Foreign Application Priority Data

Jan. 3, 2012   (KR) .................... 10-2012-0000655

(51) Int. Cl.
| | |
|---|---|
| *G06F 15/16* | (2006.01) |
| *H04L 29/06* | (2006.01) |
| *H04L 29/08* | (2006.01) |

(52) U.S. Cl.
CPC .......... *H04L 65/60* (2013.01); *H04L 65/1059* (2013.01); *H04L 67/1089* (2013.01)

(58) Field of Classification Search
CPC .. H04L 65/1059; H04L 65/60; H04L 67/1089
USPC ....................................................... 709/205
See application file for complete search history.

(56) References Cited

U.S. PATENT DOCUMENTS

| | | | |
|---|---|---|---|
| 8,209,396 B1* | 6/2012 | Raman ................. | H04N 21/235 709/217 |
| 2004/0017396 A1 | 1/2004 | Werndorfer et al. | |
| 2005/0010641 A1 | 1/2005 | Staack | |
| 2008/0021970 A1* | 1/2008 | Werndorfer ............ | G06F 3/167 709/206 |
| 2008/0146256 A1 | 6/2008 | Hawkins et al. | |
| 2008/0168139 A1 | 7/2008 | Junuzovic et al. | |
| 2008/0209075 A1* | 8/2008 | Shamma ............... | H04L 12/581 709/248 |
| 2009/0307296 A1* | 12/2009 | Gibbs ............... | G06F 17/30029 709/201 |
| 2010/0124404 A1 | 5/2010 | Park et al. | |

(Continued)

FOREIGN PATENT DOCUMENTS

| | | |
|---|---|---|
| DE | 10 2010 024 819 A1 | 12/2011 |
| EP | 2 242 259 A1 | 10/2010 |

(Continued)

OTHER PUBLICATIONS

International Search Report dated May 1, 2013 for corresponding Application No. PCT/KR2013/000023.

(Continued)

*Primary Examiner* — Bryan Lee
(74) *Attorney, Agent, or Firm* — Staas & Halsey LLP

(57) ABSTRACT

A content sharing method includes: selecting, by a content sharing terminal, content; transmitting, by the content sharing terminal, identification information of the selected content to an external device; and reproducing, by the content sharing terminal, the selected content while the external device is reproducing the selected content based on the identification information.

23 Claims, 10 Drawing Sheets

(56) References Cited

U.S. PATENT DOCUMENTS

2010/0153848 A1* 6/2010 Saha ................. G06F 17/30884
  715/721
2011/0047241 A1 2/2011 Wang
2012/0303445 A1* 11/2012 Jablokov ................ G06Q 30/02
  705/14.42

FOREIGN PATENT DOCUMENTS

| KR | 10-0653195 | 11/2006 |
| KR | 10-2006-0131357 | 12/2006 |
| KR | 10-2010-0054515 | 5/2010 |
| KR | 10-2011-0007668 | 1/2011 |

OTHER PUBLICATIONS

European Search Report dated Jun. 18, 2015 in corresponding European Patent Application No. 13733895.0.
European Communication pursuant to Article 94(3) EPC dated Apr. 8, 2016 in corresponding European Patent Application No. 13 733 895.0.
European Office Action dated Nov. 10, 2016 in corresponding European Patent Application No. 13 733 895.0, 7 pages.

* cited by examiner

METHOD AND TERMINAL FOR SHARING CONTENT

CROSS-REFERENCE TO RELATED APPLICATIONS

This application claims the benefit of Korean Patent Application No. 10-2012-0000655, filed on Jan. 3, 2012, in the Korean Intellectual Property Office, the disclosure of which is incorporated herein in its entirety by reference.

BACKGROUND

1. Field

One or more embodiments relate to a method and terminal for sharing content, whereby the same content can be reproduced by a plurality of devices.

2. Description of the Related Art

It is not easy for users in different places to share feelings while watching the same content at the same time. In general, for a plurality of users to watch the same content, one user should transmit in advance corresponding content to addresses or devices of other users, or the plurality of users should discuss to individually execute the same content.

However, there may be a case where one user needs to reproduce predetermined content at the same time in devices of the one user and another user with only a simple manipulation. In particular, when another user is a user in an elderly age group who is not familiar with operating a device or a user of a device of which a character input is inconvenient, it may be very limited for the users to watch the same content.

Thus, it is necessary to introduce a control system for allowing one user to display the same content in devices of the one user and another user with only a simple manipulation.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

According to one or more embodiments, a content sharing method may include selecting, by a content sharing terminal, content; transmitting, by the content sharing terminal, identification information of the selected content to an external device; and reproducing, by the content sharing terminal, the selected content while the external device is reproducing the selected content based on the identification information.

The content sharing method may further include: transmitting, by the content sharing terminal, a content sharing request to the external device; and receiving, by the content sharing terminal, an acceptance message on the content sharing request from the external device.

The content sharing method may further include: selecting, by the content sharing terminal, at least one of an identification value of the external device and user account information of the external device; and transmitting, by the content sharing terminal, a content sharing request to the external device based on the selected at least one of the identification value of the external device and the user account information of the external device.

The content sharing method may further include, when the content reproduced by the external device is changed from first content to second content, stopping, by the content sharing terminal, reproducing the first content, and reproducing the second content.

The content may include at least one of content, which has been already registered in a server, and content, which has been already stored in a memory of the content sharing terminal.

The identification information of the selected content may include at least one of an index of the selected content and link information of the selected content.

The content may include at least one of still image content, text content, video content, and music content.

The content sharing method may further include: displaying, by the content sharing terminal, additional information associated with the selected content; and transmitting, by the content sharing terminal, the additional information associated with the selected content to the external device.

The additional information may be changed by the content sharing terminal or the external device while the selected content is being reproduced by the content sharing terminal or the external device.

The content sharing method may further include performing, by the content sharing terminal, at least one of a voice call function, a video call function, and a chatting function.

The content sharing method may further include recommending, by the content sharing terminal, related content of which a relationship with the selected content is equal to or greater than a predetermined criterion.

According to one or more embodiments, a content sharing terminal may include a content selector for selecting content; a communication unit for transmitting identification information of the selected content to an external device; a content reproducer for reproducing the selected content while the external device is reproducing the selected content based on the identification information; and a controller for controlling the content selector, the communication unit, and the content reproducer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
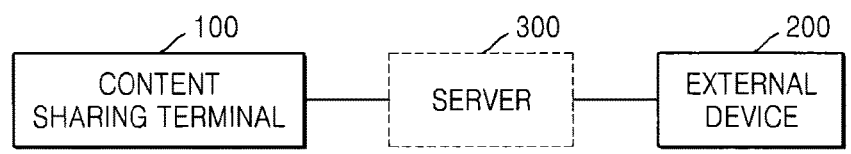
FIG. 1 is a block diagram of a content sharing system according to one or more embodiments.

The terms used in the specification will be schematically described, and then, the present invention will be described in detail.

Although general terms as currently widely used as possible are selected as the terms used in describing one or more embodiments while taking functions in the one or more embodiments into account, they may vary according to an intention of those of ordinary skill in the art, judicial precedents, or the appearance of new technology. In addition, in specific cases, terms intentionally selected by the applicant may be used, and in this case, the meaning of the terms will be disclosed in corresponding description of one or more embodiments. Accordingly, the terms used in describing one or more embodiments should be defined not by simple names of the terms but by the meaning of the terms and the content over the one or more embodiments.

In the specification, when a certain part "includes" a certain component, this indicates that the part may further include another component instead of excluding another component unless there is no different disclosure. In addition, the term, such as " . . . unit" or "module," disclosed in the specification indicates a unit for processing at least one function or operation, and this may be implemented by hardware, software, or a combination of them.

In the specification, the term 'social networking service (SNS) indicates a service for having a relationship with unspecified people through online. Users may make new personal connections or strengthen existing personal connections through an SNS. In addition, in the specification, the term 'SNS group' indicates a group generated by users using an SNS. According to one or more embodiments, to be a member of an SNS group, a process of registering an account or a device identification value in a server is necessary.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a content sharing system according to one or more embodiments.

As shown in FIG. 1, the content sharing system may include a content sharing terminal 100, an external device 200, and a server 300. However, all the shown components are not mandatory components. The content sharing system may be realized by more or less components than the shown components.

The content sharing terminal 100 is a terminal of a user who desires to watch predetermined content with another user at the same time. That is, the content sharing terminal 100 is a terminal for requesting to share content. The number of content sharing terminals 100 may be plural. The content sharing terminal 100 may display the same content as that of the external device 200 at the same time.

The content sharing terminal 100 may be realized in various forms. The content sharing terminal 100 described with regard to one or more embodiments may include, for example, a desktop computer, a mobile phone, a smart phone, a laptop computer, a digital broadcast terminal, a personal digital assistant (PDA), a portable multimedia player (PMP), a navigation machine, a tablet computer, an MP3 player, a digital camera, a consumer electronics (CE) device, and so forth.

The external device 200 indicates a terminal, which may receive a content sharing request. The external device 200 may transmit an acceptance or rejection message in response to a content sharing request of the content sharing terminal 100. The number of external devices 200 may be plural. That is, according to one or more embodiments, the content sharing terminal 100 may transmit a content sharing request to a plurality of external devices 200.

The external device 200 may also be realized in various forms. The external device 200 described with regard to one or more embodiments may include, for example, a desktop computer, a mobile phone, a smart phone, a laptop computer, a digital broadcast terminal, a PDA, a PMP, a navigation machine, a tablet computer, an MP3 player, a digital camera, and so forth.

In particular, the external device 200 may include a CE device. The CE device may include a digital television (DTV), an Internet Protocol TV (IPTV), a refrigerator having a display device, an air conditioner, and so forth.

The external device 200 may be able to communicate with the content sharing terminal 100 in a wired or wireless manner. For example, the external device 200 may receive identification information of content to be displayed at the same time from the content sharing terminal 100.

In addition, when a user of the external device 200 changes content being reproduced, the external device 200 may transmit identification information of the changed content to the content sharing terminal 100.

According to one or more embodiments, the external device 200 may support functions of a voice call, a video call, and a chatting service with the content sharing terminal 100.

The external device 200 may be able to communicate with the server 300 in a wired or wireless manner. For example, the external device 200 may receive various pieces of content and services provided by the server 300 from the server 300.

The server 300 may relay content sharing between the content sharing terminal 100 and the external device 200. For example, the server 300 may receive a content sharing request and identification information of content from the content sharing terminal 100 and transmit the received content sharing request and identification information to the external device 200. In addition, the server 300 may receive an acceptance message in response to the content sharing request or identification information of content from the external device 200 and transmit the received acceptance message or identification information to the content sharing terminal 100.

The server 300 may be an SNS server. The SNS server is a server, which provides an SNS. When the server 300 provides an SNS, the user of the content sharing terminal 100 and the user of the external device 200 may belong to the same SNS group.

According to one or more embodiments, the server 300 may store an identification value (e.g., a device identifier (ID), a media access control (MAC) address, a telephone number, etc.) of the content sharing terminal 100, user identification information (e.g., an account and an ID) of the content sharing terminal 100, an identification value of the external device 200, user identification information of the external device 200, and so forth.

The server 300 may store content. In this case, the server 300 may classify various pieces of content based on predetermined categories and store the content. The content may include, for example, one of still image content, text content, video content, and music content.

The server 300 may provide link information of content to the content sharing terminal 100 or the external device 200. The link information may indicate information regarding a content access path by which the content sharing terminal 100 or the external device 200 can access specific content. An example of the link information is a uniform/universal resource locator (URL).

Figure 2:
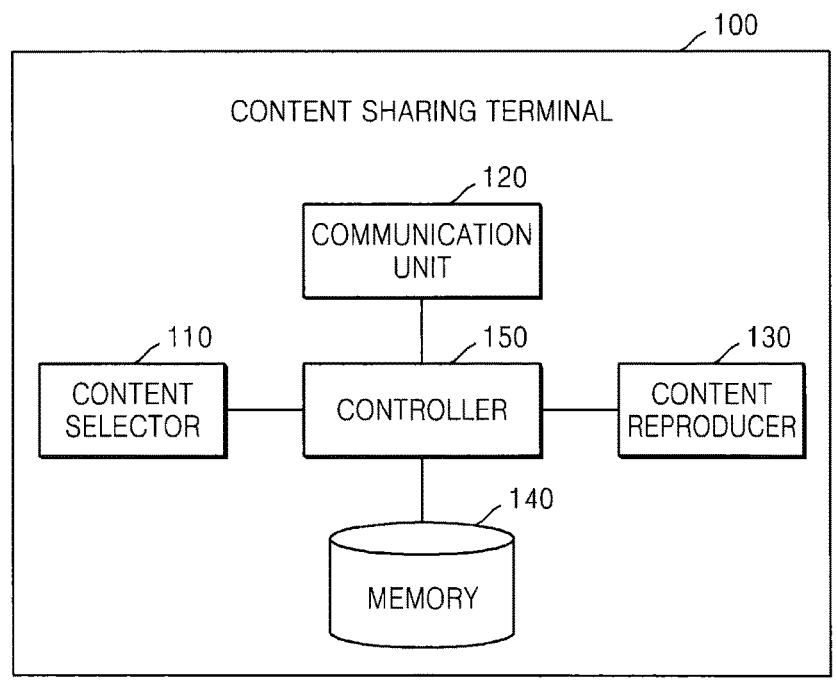
FIG. 2 is a block diagram of a content sharing terminal according to one or more embodiments.

FIG. 2 is a block diagram of the content sharing terminal 100 according to one or more embodiments.

As shown in FIG. 2, the content sharing terminal 100 may include, for example, a content selector 110, a communication unit 120, a content reproducer 130, a memory 140, and a controller 150. However, all the shown components are not mandatory components. The content sharing terminal 100 may be realized by more or less components than the shown components.

The content selector 110 may select content. According to one or more embodiments, the content selector 110 may select content based on an input of the user of the content sharing terminal 100. That is, according to one or more embodiments, the content selector 110 may be a type of a user input unit.

The user input unit may generate input data for the user to control an operation of the content sharing terminal 100. The user input unit may include, for example, a keypad, a dome switch, a (resistive/capacitive) touch pad, a jog wheel, a jog switch, and so forth. In particular, when the touch pad has a layer structure together with a display unit to be described below, this may be called a touch screen.

Content according to one or more embodiments may include, for example, one of still image content (e.g., a photograph, a picture, etc.), text content (e.g., poetry, a novel, a letter, a business file, a detailed description of content, etc.), video content (e.g., a film, a music video, a personal video, a YouTube video, a TV program video, etc.), and music content (e.g., music, rendition, radio, etc.). That is, the content according to one or more embodiments may include not only multimedia content but also various other types of content.

The content according to one or more embodiments may be one of content, which has been already registered in the server 300, and content, which has been already stored in the memory 140 of the content sharing terminal 100.

The communication unit 120 may include one or more components for wired or wireless communication between the content sharing terminal 100 and the external device 200. For example, the communication unit 120 may include a broadcast receiving module, a mobile communication module, a wireless Internet module, a wired Internet module, a short-range wireless communication module, a position information module, and so forth.

The broadcast receiving module may receive a broadcast signal and/or broadcast related information from an external broadcast management server through a broadcast channel. The wireless Internet module indicates a module for accessing a wireless Internet service and may be installed inside or outside the content sharing terminal 100. The wired Internet module indicates a module for accessing a wired Internet service.

The mobile communication module may transmit and receive a wireless signal to and from one of a base station in a mobile communication network, the external device 200, and the server 300. The wireless signal may include, for example, various types of data according to transmission and reception of a voice call signal, a video call signal, or a text/multimedia message.

The short-range wireless communication module indicates a module for establishing short-range wireless communication. As near distance communication technology, for example, Bluetooth, radio frequency identification (RFID), infrared data association (IrDA), ultra wideband (UWB), ZigBee, near field communication (NFC), or the like may be used.

The position information module indicates a module for checking or obtaining a position of the content sharing terminal 100. An example of the position information module is a global position system (GPS) module. The GPS module receives position information from a plurality of satellites. The position information may include coordinate information displayed with latitude and longitude.

The communication unit 120 may transmit a content sharing request to the external device 200. The content sharing request indicates a request for the external device 200 to simultaneously reproduce the same content as being reproduced by the content sharing terminal 100.

According to one or more embodiments, the communication unit 120 may transmit a content sharing request to the external device 200 based on one of identification information of the external device 200 and user account information of the external device 200.

The communication unit 120 may receive an acceptance message in response to the content sharing request from the external device 200. According to one or more embodiments, the communication unit 120 may transmit a content sharing request to the external device 200 or receive an acceptance message from the external device 200, through a Peer to Peer (P2P) scheme. According to one or more embodiments, the communication unit 120 may transmit a content sharing request to the external device 200 and receive an acceptance message from the external device 200, via the server 300.

According to one or more embodiments, when an acceptance message in response to a content sharing request is received, the communication unit 120 may receive identification information of content from the server 300. For example, when the content sharing terminal 100 selects a specific category, the server 300 may transmit link information of a plurality of pieces of content in the specific category to the content sharing terminal 100 and the external device 200.

The communication unit 120 may transmit the identification information of the content to the external device 200. In this case, according to one or more embodiments, the communication unit 120 may directly transmit the identification information of the content to the external device 200 or transmit the identification information of the content to the external device 200 via the server 300. Identification information of content according to one or more embodiments may include, for example, one of an index of the content and link information of the content.

The communication unit 120 may transmit additional information associated with the selected content to the external device 200. According to one or more embodiments, the additional information may be transmitted to the external device 200 in the form of metadata. Additional information associated with content may include, for example, a content creation time, a content creation position, a comment on the content, and so forth.

The additional information associated with content according to one or more embodiments may be changed by the content sharing terminal 100 or the external device 200 while the content is being reproduced by the content sharing terminal 100 or the external device 200.

The content reproducer 130 is a module for reproducing content of various formats. For example, the content reproducer 130 may include, for example, a display unit, a sound output module, and so forth.

The display unit may display information processed by the content sharing terminal 100. For example, when content selected by the user is still image content, such as a photograph or a picture, or text content, the display unit may display the still image content or the text content on a screen.

As described above, when the display unit and a touch pad have a layer structure to form a touch screen, the display unit may be used as an input device in addition to an output device. The display unit may include, for example, one of a liquid crystal display (LCD), a thin film transistor (TFT)-LCD, an organic light-emitting diode (OLED) display, a flexible display, and a three-dimensional (3D) display. Two or more display units may be used according to an implementation form of the content sharing terminal 100. The touch screen may be formed to detect, for example, a touch input position, a touch area, and a touch input pressure. In addition, the touch screen may be formed to detect not only a real touch but also a proximity touch.

According to one or more embodiments, when content selected by the user is video content or music content, the sound output module may output a sound signal included in the video content or the music content.

The content reproducer 130 may reproduce content being reproduced by the external device 200. That is, the content sharing terminal 100 and the external device 200 may reproduce the same content at the same time by transmitting and receiving identification information of the content being reproduced. According to one or more embodiments, the identification information of the content being reproduced may be transmitted and received in a predetermined period or when a change in the content being reproduced occurs.

According to one or more embodiments, the content reproducer 130 may display additional information associated with the content being reproduced.

The memory 140 may store a program for processing and controlling the controller 150 or perform a function of storing input/output data. For example, the memory 140 may store identification information of content, such as a still image and a video, and content, such as a URL.

The memory 140 may include, for example, a storage medium of at least one type of flash memory, hard disk, multimedia card micro, card-type memory (e.g., secure digital (SD) or extreme digital (XD) memory), Random Access Memory (RAM), Static RAM (SRAM), Read-Only Memory (ROM), Electricity Erasable Programmable ROM (EEPROM), PROM, magnetic memory, magnetic disc, and optical disc. In addition, the content sharing terminal 100 may operate a web storage for performing a storage function of the memory 140 over the Internet.

The controller 150 may generally control the content selector 110, the communication unit 120, the content reproducer 130, and the memory 140.

According to one or more embodiments, the controller 150 may provide one of a voice call service, a video call service, and a chatting service between the user of the content sharing terminal 100 and the user of the external device 200.

The controller 150 may recommend related content of which a relationship with content selected by the user of the content sharing terminal 100 is equal to or greater than a predetermined criterion. That is, according to one or more embodiments, the content sharing terminal 100 may recommend content related to content being reproduced so that the user of the content sharing terminal 100 can easily share the related content with the user of the external device 200.

According to one or more embodiments, the controller 150 may recommend related content of which a relationship is equal to or greater than the predetermined criterion, based on metadata of content selected by the user of the content sharing terminal 100 (or being reproduced by the content sharing terminal 100). For example, as a result of checking the metadata of the content selected by the user, if the metadata indicates photograph content created in Japan in October 2011, the controller 150 may recommend other photograph content or video content created in Japan in October 2011.

According to one or more embodiments, the controller 150 may extract a keyword from a conversation between the user of the content sharing terminal 100 and the user of the external device 200 and recommend related content associated with the extracted keyword.

The controller 150 may provide an online or offline state of the external device 200.

A method of reproducing the same content at the same time by the content sharing terminal 100 and the external device 200 by using the components of the content sharing terminal 100 will now be described with reference to FIG. 3.

Figure 3:
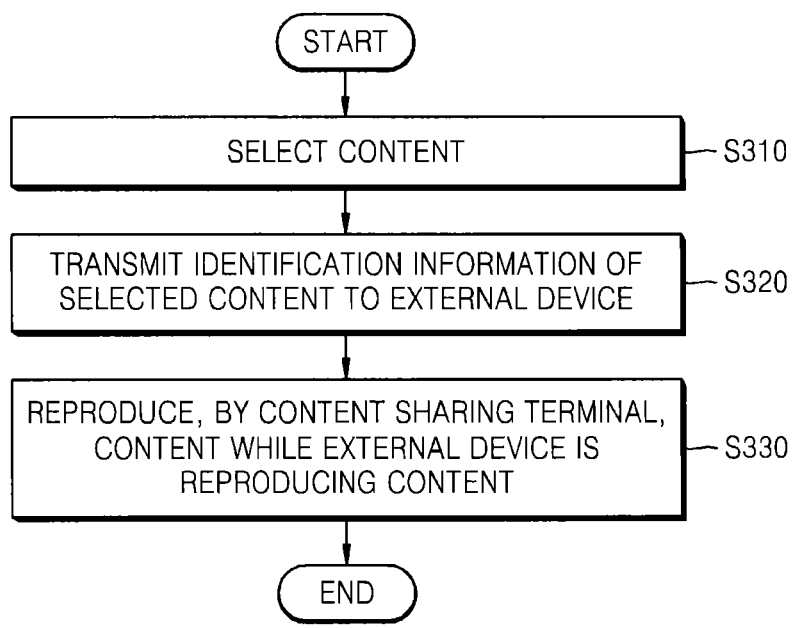
FIG. 3 is a flowchart illustrating a content sharing method according to one or more embodiments.

FIG. 3 is a flowchart illustrating a content sharing method according to one or more embodiments.

Referring to FIG. 3, the content sharing method includes operations sequentially processed by the content sharing terminal 100 of FIG. 2. Thus, although omitted hereinafter, the description related to the content sharing terminal 100 of FIG. 2 is applicable to the content sharing method of FIG. 3.

In operation S310, the content sharing terminal 100 may select content. According to one or more embodiments, the content sharing terminal 100 may select content based on the user's selection. That is, the user may select content which the user desires to share with the user of the external device 200, using the content sharing terminal 100.

The content may be pre-registered in the server 300 or pre-stored in the memory 140 of the content sharing terminal 100. In addition, the content may be, for example, still image content, such as a photograph or a picture, text content, video content, or music content.

In operation S320, the content sharing terminal 100 may transmit identification information of the selected content to the external device 200. Identification information of content indicates information used to identify the content selected by the user. For example, the identification information of content may include an index of the content and link information of the content.

According to one or more embodiments, the content sharing terminal 100 may transmit an index of the selected content to the external device 200. In this case, the external device 200 may reproduce the selected content based on the index.

According to one or more embodiments, the content sharing terminal 100 may transmit link information of the selected content to the external device 200. Hereinafter, a URL is described as an example of the link information.

The content sharing terminal 100 may transmit and receive only link information of content to and from the external device 200 instead of transmitting and receiving the content, thereby possibly reducing traffic.

In operation S330, while the external device 200 is reproducing the content based on the identification information of the selected content, the content sharing terminal 100 may also reproduce the selected content. That is, according to one or more embodiments, the content sharing terminal 100 and the external device 200 may reproduce the same content at the same time.

For example, the content sharing terminal 100 may receive content A selected by the user from the server 300 and reproduce the content A based on a URL of the content A. In addition, the content sharing terminal 100 may transmit the URL of the content A to the external device 200. In this case, the external device 200 may receive the content A from the server 300 and reproduce the content A based on the URL of the content A. Thus, the content sharing terminal 100 and the external device 200 may reproduce the same content at the same time.

When the content sharing terminal 100 and the external device 200 store in advance URL information of a plurality of pieces of content, the content sharing terminal 100 may transmit an index of content selected by the user to the external device 200 while reproducing the selected content. In this case, the external device 200 may reproduce the same content as being reproduced by the content sharing terminal 100 based on the index of the selected content.

If the content being reproduced is changed from the content A to content B, the content sharing terminal 100 and the external device 200 may transmit and receive identification information of the content B to reproduce the content B at the same time.

A method of sharing content between the content sharing terminal 100 and the external device 200 will now be described in more detail with reference to FIG. 4.

Figure 4:
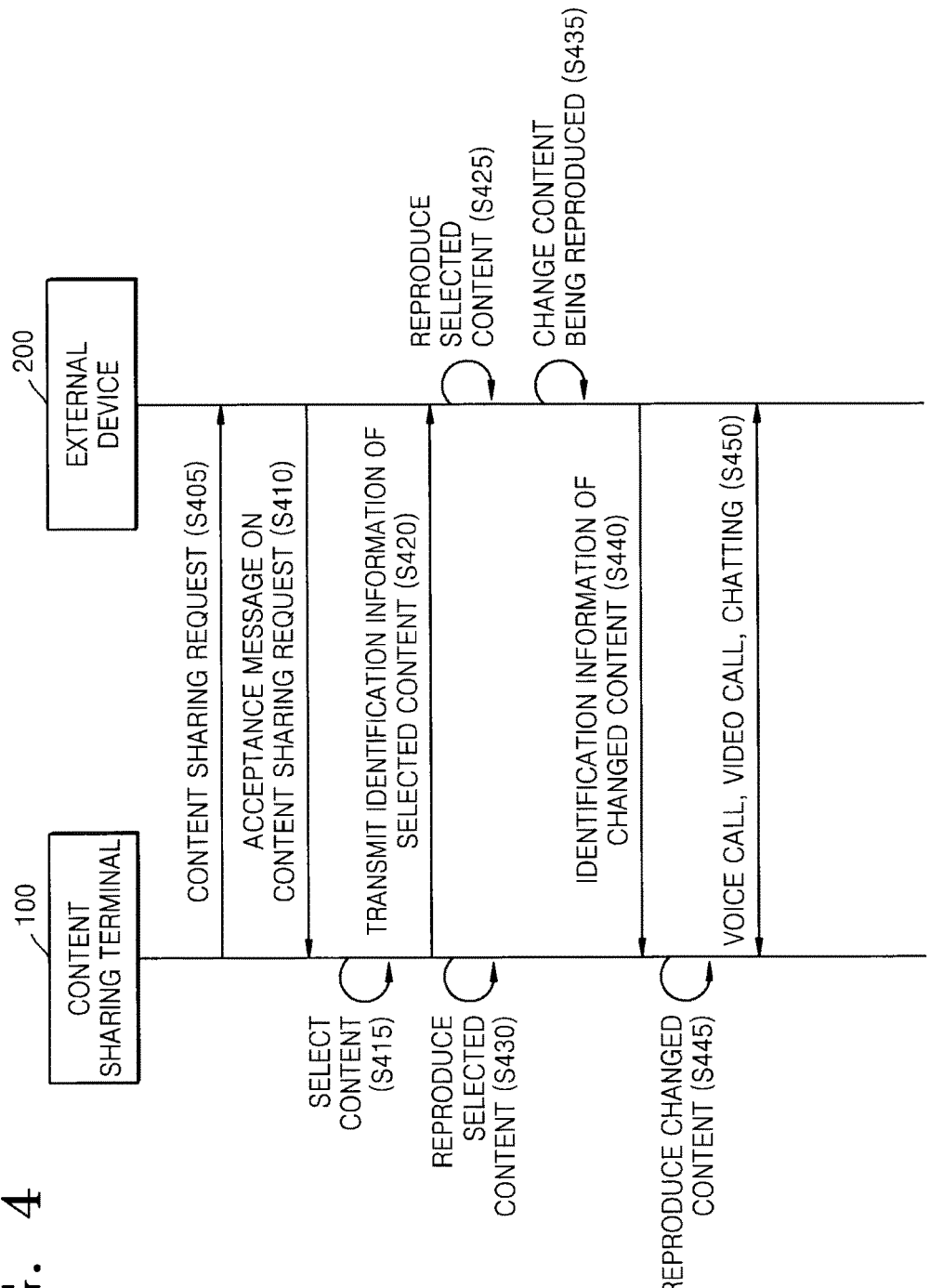
FIG. 4 is a signaling diagram illustrating a content sharing method according to one or more embodiments.

FIG. 4 is a signaling diagram illustrating a content sharing method according to one or more embodiments.

Referring to FIG. 4, the content sharing method may include operations sequentially processed by the content sharing terminal 100 of FIG. 2. Thus, although omitted hereinafter, the description related to the content sharing terminal 100 of FIG. 2 is applicable to the content sharing method of FIG. 4.

In operation S405, the content sharing terminal 100 may transmit a content sharing request to the external device 200. The content sharing request may include, for example, user account information of the content sharing terminal 100, an identification value of the content sharing terminal 100, a type of content, and contents of the content.

According to one or more embodiments, the content sharing terminal 100 may transmit a content sharing request to the external device 200 based on user account information of the external device 200.

Figure 5:
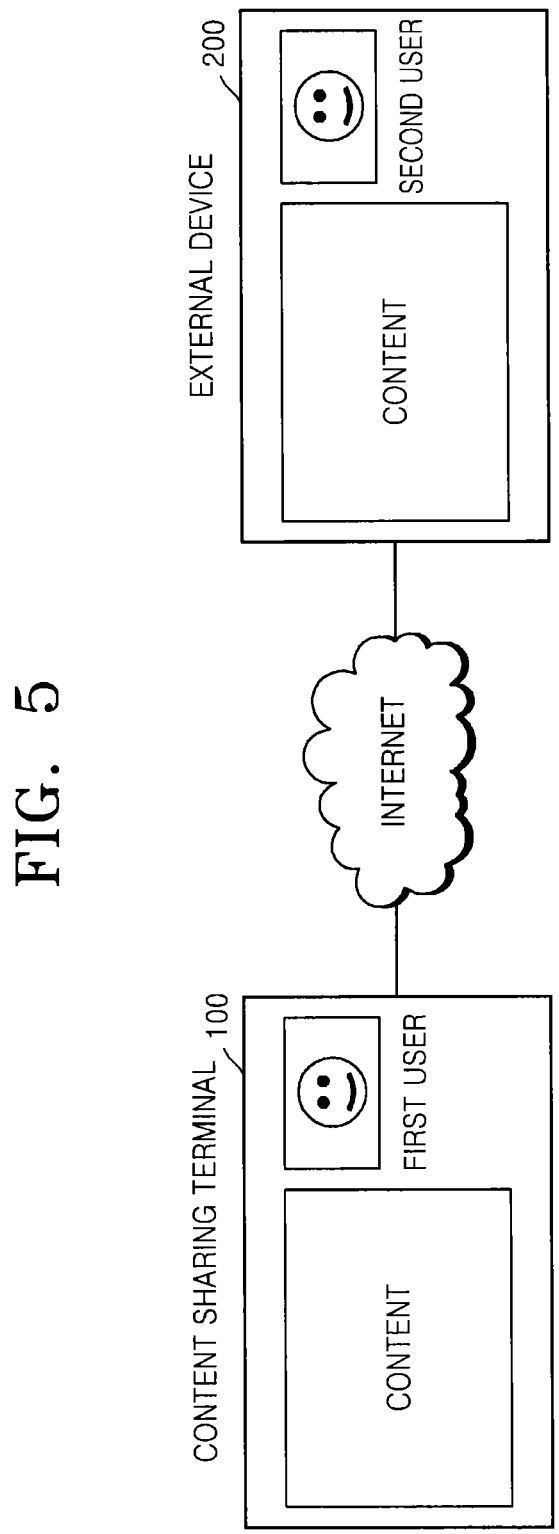
FIG. 5 illustrates content sharing screens of the content sharing terminal and an external device, according to one or more embodiments.

For example, as shown in FIG. 5, a first user of the content sharing terminal 100 may desire to watch content X with a second user of the external device 200 at the same time. In this case, the first user may input account information of the second user through the content sharing terminal 100. Then, the content sharing terminal 100 may transmit a content sharing request to the external device 200 based on the account information of the second user, which has been input by the first user.

According to one or more embodiments, the content sharing terminal 100 may transmit a content sharing request to the external device 200 based on an identification value of the external device 200. The identification value of the external device 200 indicates unique information for identifying the external device 200 and may include, for example, a device ID, a unique serial number, a MAC address, an International Mobile Equipment Identity (IMEI) code, and so forth.

According to one or more embodiments, the external device 200 may register in advance the identification value of the external device 200 in the server 300. In this case, the content sharing terminal 100 may receive the identification value of the external device 200 from the server 300.

According to one or more embodiments, the content sharing terminal 100 may store the identification value of the external device 200 in the memory 140.

According to one or more embodiments, the content sharing terminal 100 may transmit a content sharing request to a plurality of external devices 200. For example, the content sharing terminal 100 may transmit a content sharing request to a first external device and a second external device at the same time. As another example, the content sharing terminal 100 may additionally transmit a content sharing request to the second external device while sharing content with the first external device.

In operation S410, the content sharing terminal 100 may receive an acceptance message in response to the content sharing request from the external device 200. In this case, the content sharing terminal 100 and the external device 200 may form a network through which the same content can be reproduced.

In operation S415, the content sharing terminal 100 may select content to be shared with the external device 200. According to one or more embodiments, the content sharing terminal 100 may recommend related content of which a relationship with the content selected by the user is equal to or greater than the predetermined criterion. In this case, the user of the content sharing terminal 100 may simply share the related content with the user of the external device 200 without a separate search.

A relationship between pieces of content may be calculated based on metadata of the pieces of content. For example, the relationship between pieces of content may be calculated based on whether content creation times, content creation places, or the like of the pieces of content match each other.

According to one or more embodiments, the content sharing terminal 100 may extract a keyword from a conversation between the user of the content sharing terminal 100 and the user of the external device 200 and recommend related content associated with the extracted keyword.

In operation S420, the content sharing terminal 100 may transmit identification information of the selected content to the external device 200.

According to one or more embodiments, when the content sharing terminal 100 and the external device 200 receive link information of content from the server 300, the content sharing terminal 100 may transmit an index of the content to the external device 200 to specify content to be shared.

Figure 6:
FIG. 6 illustrates identification information of content, according to one or more embodiments.

Referring to FIG. 6, a user A of the content sharing terminal 100 may select content included in an SNS group (e.g., John's family) to share the selected content with the user of the external device 200. In this case, the server 300 may transmit, to the content sharing terminal 100 and the external device 200, a URL of the content included in the SNS group (e.g., John's family) to which the user A has subscribed.

Since the content sharing terminal 100 and the external device 200 store link information of the content, the content sharing terminal 100 may transmit an index of the content selected by the user A.

According to one or more embodiments, the content sharing terminal 100 may transmit link information (e.g., a URL) of the selected content to the external device 200.

The content sharing terminal 100 may transmit a plurality of pieces of identification information of a plurality of pieces of content. In this case, the content sharing terminal 100 and the external device 200 may share the plurality of pieces of content.

According to one or more embodiments, the content sharing terminal 100 may transmit identification information of content in addition to a content sharing request to the external device 200. For example, when a first user of the content sharing terminal 100 selects content A, the content sharing terminal 100 may transmit a content sharing request including identification information of the content A to the external device 200.

In operation S425, the external device 200 may reproduce the selected content based on the identification information of the selected content, which may have been received from the content sharing terminal 100. In operation S430, the content sharing terminal 100 also reproduces the selected content.

According to one or more embodiments, the content sharing terminal 100 may display additional information associated with the selected content. For example, when a photograph A is selected, a creation time, a creation place, and so forth of the photograph A may be displayed together with the photograph A.

In addition, the content sharing terminal 100 may transmit the additional information associated with the selected content to the external device 200. In this case, the additional information associated with the selected content may also be displayed by the external device 200.

According to one or more embodiments, the content sharing terminal 100 and/or the external device 200 may update the additional information associated with the selected content while reproducing the selected content. For example, the content sharing terminal 100 and/or the external device 200 may correct the creation place of the photograph A when the creation place of the photograph A is wrong or may add personal information to the photograph A.

In operation S435, the content being reproduced by the external device 200 may be changed from first content to second content. In operation S440, the content sharing terminal 100 may receive identification information of the second content from the external device 200. In operation S445, the content sharing terminal 100 may stop reproducing the first content and may reproduce the second content.

That is, according to one or more embodiments, when content reproduced by the content sharing terminal 100 or the external device 200 is changed, the content sharing terminal 100 and the external device 200 may exchange identification information of the changed content to continuously reproduce the same content at the same time.

According to one or more embodiments, the content sharing terminal 100 may provide, for example, a voice call service, a video call service, and a chatting service between the user of the content sharing terminal 100 and the user of the external device 200.

Referring to FIG. 5, the first user of the content sharing terminal 100 and the second user of the external device 200 may make a voice call, a video call, or chatting therebetween while watching the same content at the same time.

FIGS. 7 to 11 are diagrams for describing a content sharing method according to one or more embodiments.

Figure 7:
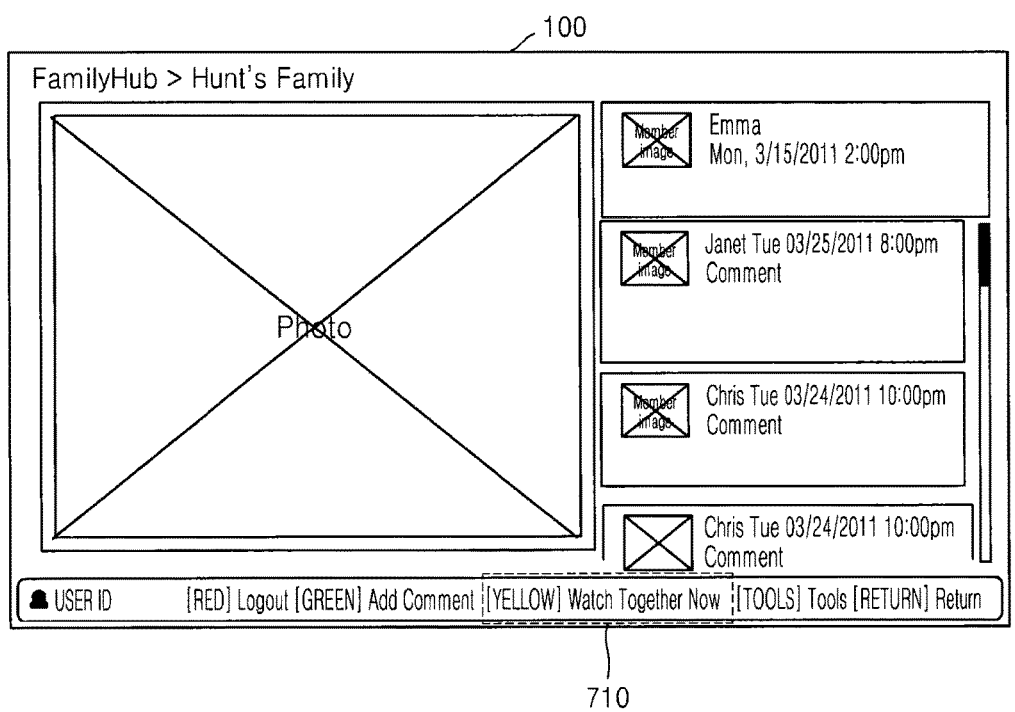
FIGS. 7 to 11 are diagrams for describing a content sharing method according to one or more embodiments.

Referring to FIG. 7, the content sharing terminal 100 may include a shortcut key 710 that is used to perform a content sharing function. When a first user of the content sharing terminal 100 designates an identification value or a second user account of the external device 200 and selects the shortcut key 710, the content sharing terminal 100 may transmit a content sharing request to the external device 200.

Figure 8:
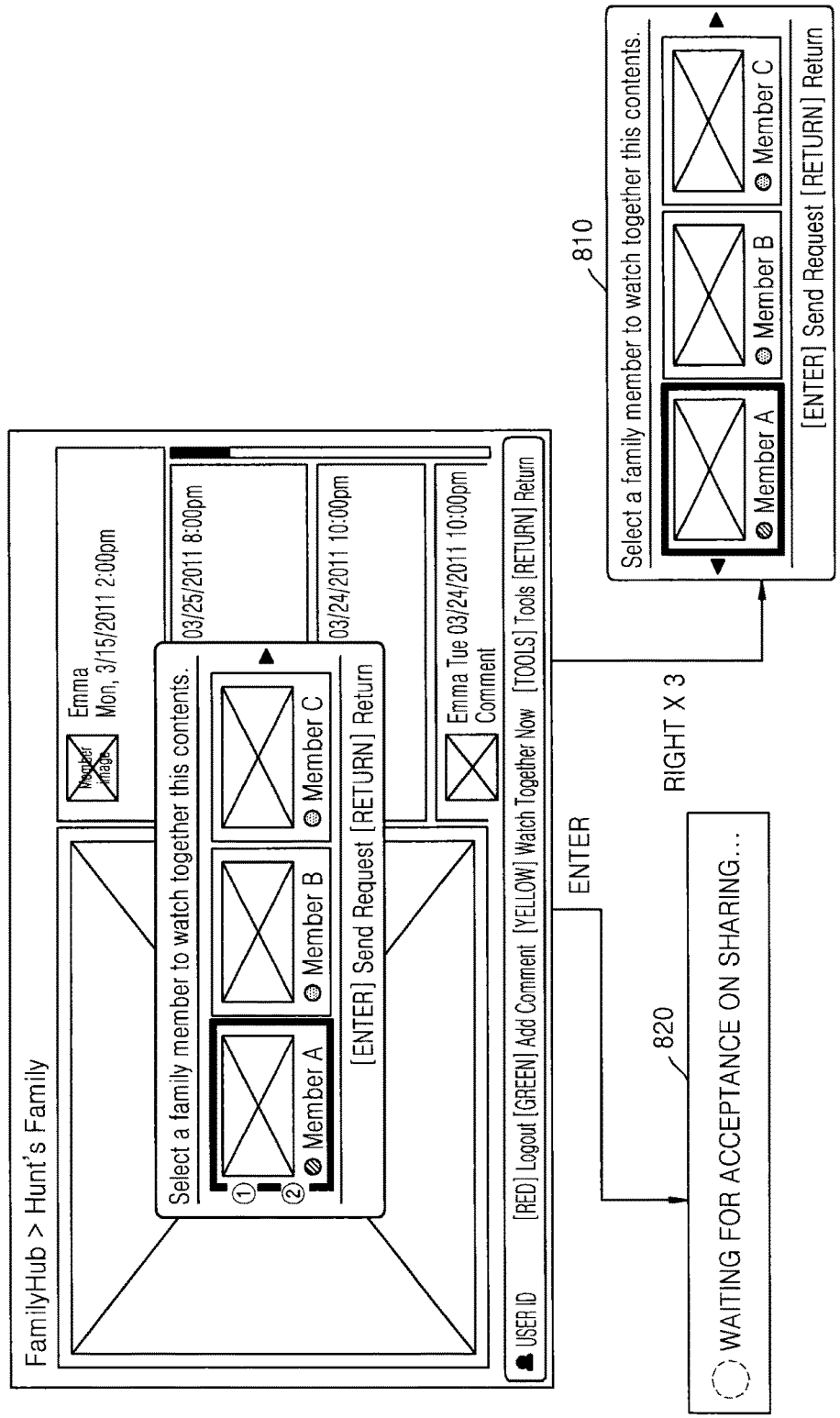

Referring to FIG. 8, the content sharing terminal 100 may provide an online or offline state of the external device 200 (refer to reference numeral 810). For example, when a device 200 of a member A is in an online state, and a device of a member B and a device of a member C are in an offline state, the content sharing terminal 100 may display the member A as green and the members B and C as gray. In addition, the content sharing terminal 100 may first display members in a login state.

When the content sharing terminal 100 transmits a content sharing request to the external device 200 in an online state, the content sharing terminal 100 may display a comment of waiting for an acceptance of the external device 200 (refer to reference numeral 820).

Figure 9:
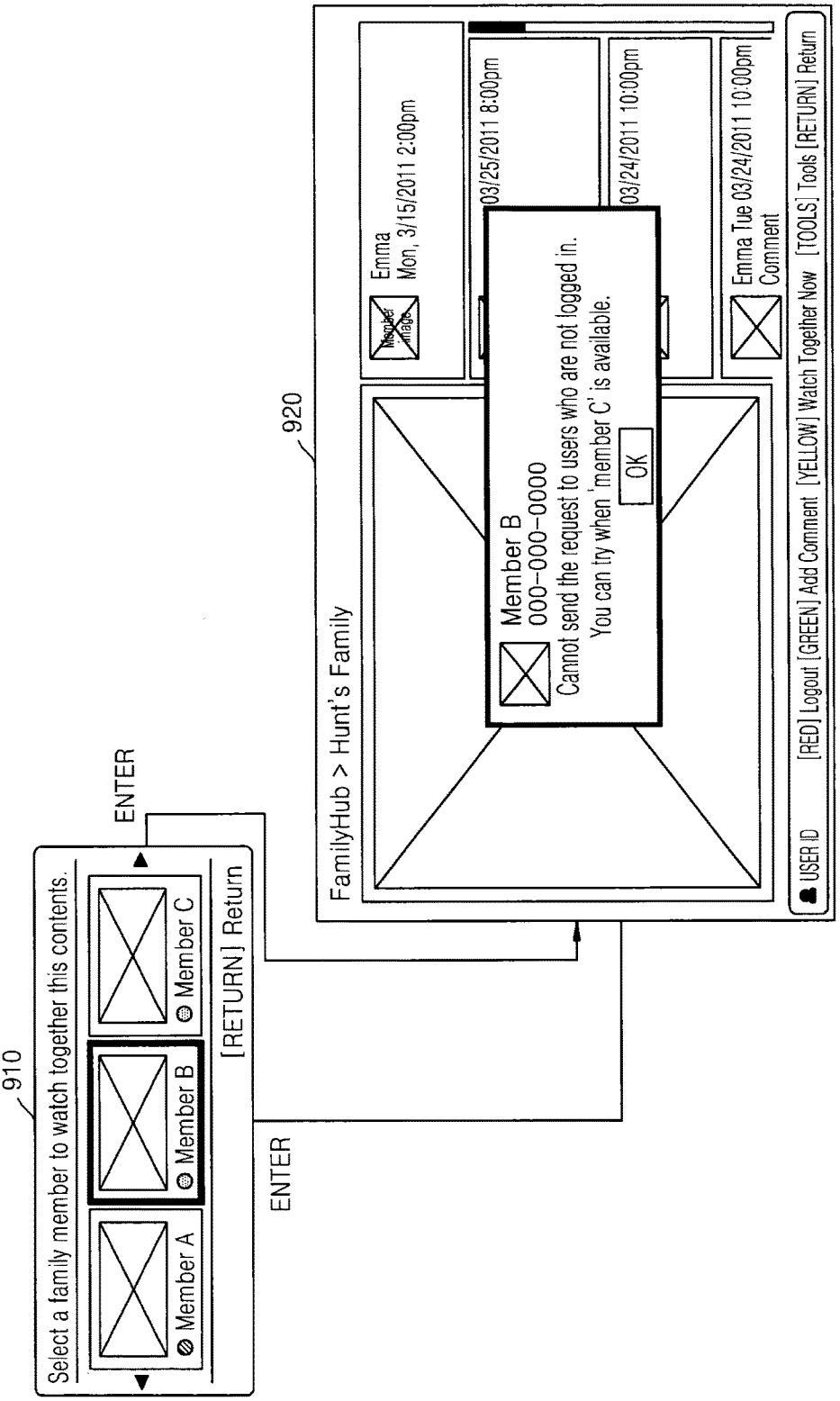

Referring to FIG. 9, when the content sharing terminal 100 transmits a content sharing request to the external device 200 in an offline state, the content sharing terminal 100 may display a comment indicating that the content sharing request cannot be transmitted. In addition, according to one or more embodiments, thereafter, when the external device 200 is in an online state, the content sharing terminal 100 may automatically transmit a content sharing request to the external device 200.

Figure 10:
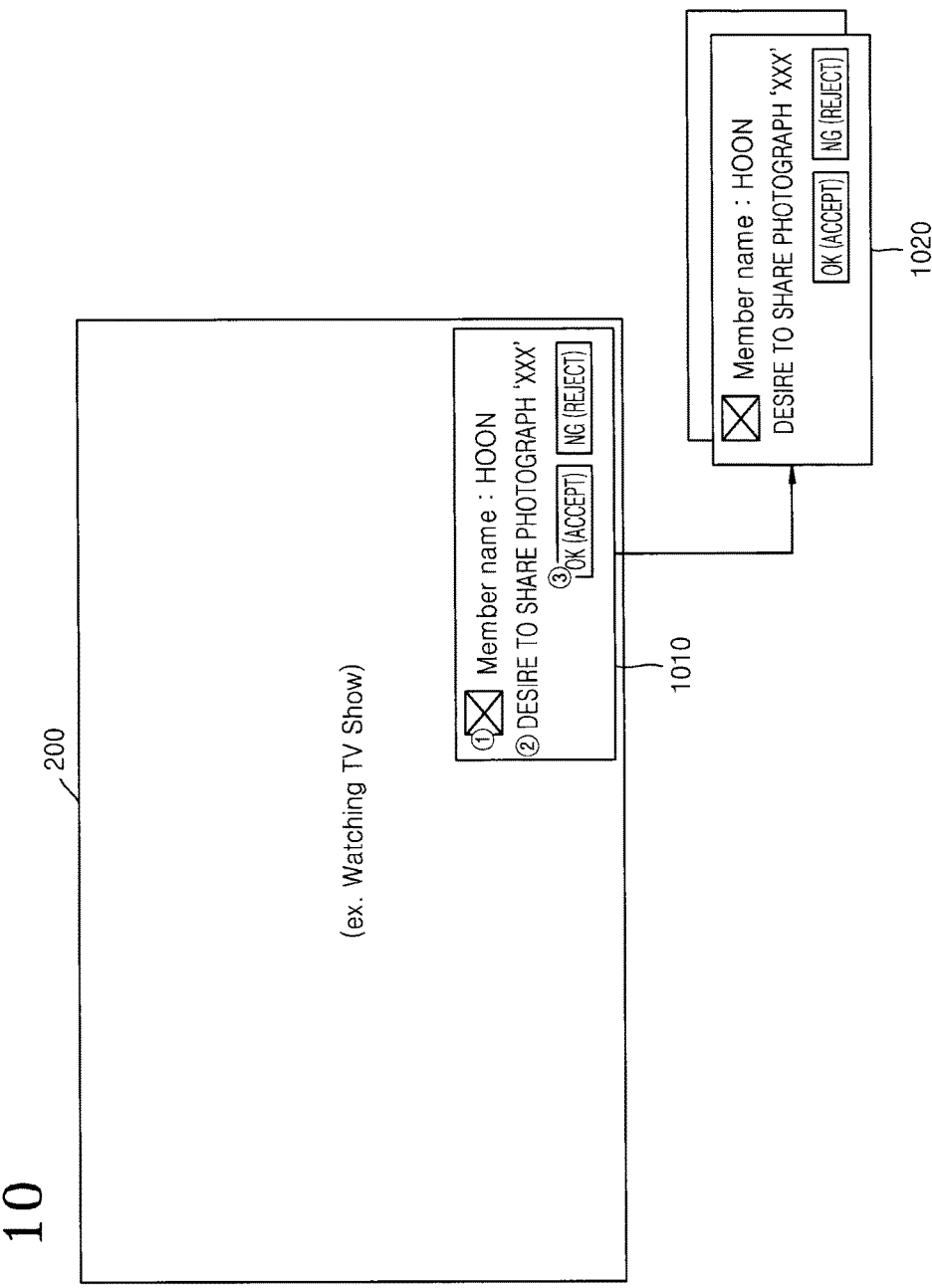

Referring to FIG. 10, the external device 200 may receive a content sharing request from the content sharing terminal 100. The user of the external device 200 may check the content sharing request and accept or reject the content sharing request.

The content sharing request may include requester information (e.g., member name: HOON), content information (e.g., photograph 'XXX'), and so forth (refer to reference numeral 1010).

The external device 200 may receive a plurality of content sharing requests. According to one or more embodiments, the external device 200 may receive a plurality of content sharing requests from a plurality of content sharing terminals 100 or one content sharing terminal 100.

When the external device 200 receives a plurality of content sharing requests, the external device 200 may display the plurality of content sharing requests by using an overlapping effect (refer to reference numeral 1020).

Figure 11:
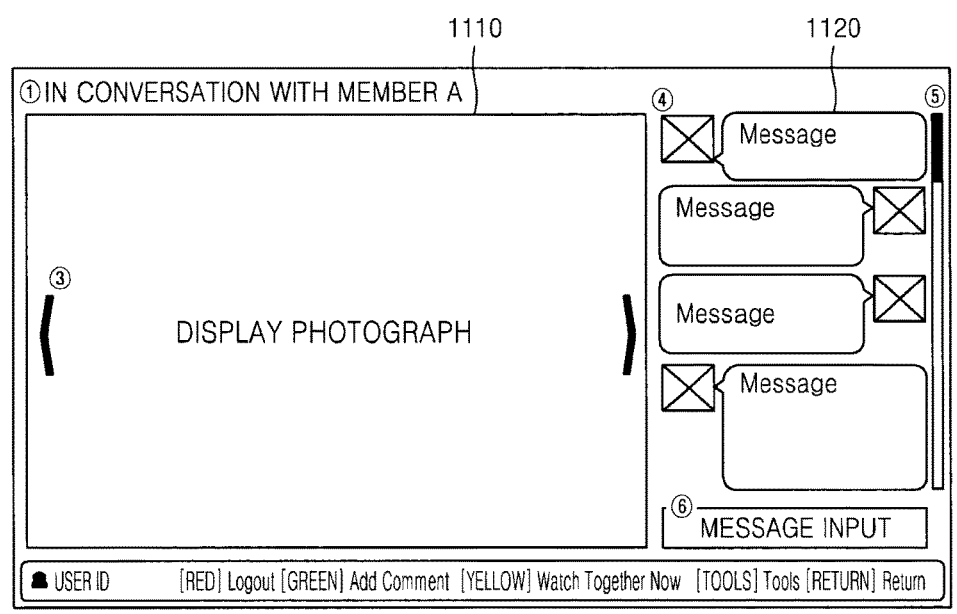

Referring to FIG. 11, the content sharing terminal 100 may reproduce the same content as that of the external device 200. The content sharing terminal 100 may perform, for example, the voice call function, the video call function, or the chatting function while reproducing the content. According to one or more embodiments, the content sharing terminal 100 may reproduce the same content as that of the external device 200 while performing, for example, the voice call function, the video call function, or the chatting function.

According to one or more embodiments, the first user of the content sharing terminal 100 may exchange opinions with the second user of the external device 200 while watching the same content as the second user watches.

According to one or more embodiments, by allowing a plurality of devices to reproduce the same content at the same time, users at places far from each other may simply watch the same content at the same time. Thus, a plurality of users may watch the same content while recalling old times or check the same content during a business meeting.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A content sharing method comprising:
   selecting content using a content sharing terminal;
   providing states of a plurality of external devices;
   transmitting identification information of the selected content using the content sharing terminal to one or more external devices which are selected among the plurality of external devices based on the states of the plurality of external devices, wherein the identification information of the selected content includes link information of the selected content;
   reproducing the selected content using the content sharing terminal while the one or more external devices are reproducing the selected content based on the identification information,
   wherein the reproducing of the selected content by the content sharing terminal further comprises:
      displaying additional information associated with the selected content using the content sharing terminal, and
      transmitting the additional information associated with the selected content using the content sharing terminal to the one or more external devices;
   changing the additional information associated with the selected content using the content sharing terminal and the one or more external devices while the selected content is reproduced,
      wherein the additional information being changed by the content sharing terminal and the one or more external devices is text which describes the selected content; and
      wherein the selected content is transmitted to the content sharing terminal and the one or more external devices from a server which corresponds to the link information of the selected content.

2. The content sharing method of claim 1, further comprising:
   transmitting a content sharing request using the content sharing terminal to the one or more external devices; and
   receiving an acceptance message on the content sharing request using the content sharing terminal from the one or more external devices.

3. The content sharing method of claim 2, wherein the transmitting of the content sharing request comprises:
   selecting at least one of an identification value of the one or more external devices and user account information of the one or more external devices using the content sharing terminal; and
   transmitting the content sharing request using the content sharing terminal to the external devices based on the selected at least one of the identification value of the one or more external devices and the user account information of the one or more external devices.

4. The content sharing method of claim 1, further comprising, when the content reproduced by the one or more external devices are changed from first content to second content, stopping the reproducing of the first content by the content sharing terminal and reproducing the second content.

5. The content sharing method of claim 1, wherein the content includes at least one of content that has been already registered in a server and content that has been already stored in a memory of the content sharing terminal.

6. The content sharing method of claim 1, wherein the identification information of the selected content includes at least one of an index of the selected content and link information of the selected content.

7. The content sharing method of claim 1, wherein the content includes at least one of still image content, text content, video content, and music content.

8. The content sharing method of claim 1, wherein the communication between the content sharing terminal and the one or more external devices includes performing at least one of a voice call function, a video call function, and a chatting function between the content sharing terminal and the one or more external devices.

9. A non-transitory computer-readable storage medium having stored therein program instructions, which when executed by a computer, perform the content sharing method of claim 1.

10. The content sharing method of claim 1, wherein the additional information is the metadata of the selected content.

11. The content sharing method of claim 1, further comprising: recommending additional related content based on metadata of the selected content.

12. The content sharing method of claim 1, wherein the additional information is metadata.

13. A content sharing terminal comprising:
a content selector for selecting content;
a display providing states of a plurality of external devices;
a communication unit for transmitting identification information of the selected content to one or more external devices which are selected among the plurality of external devices based on the states of the plurality of external devices, wherein the identification information of the selected content includes link information of the selected content;
a content reproducer for reproducing the selected content while the one or more external devices are reproducing the selected content based on the identification information,
wherein the content reproducer displays additional information associated with the selected content,
wherein the communication unit transmits the additional information associated with the selected content to the one or more external devices; and
a controller for controlling the content selector, the communication unit, and the content reproducer,
wherein the selected content is transmitted to the content sharing terminal and the one or more external devices from a server which corresponds to the link information of the selected content,
wherein the controller is further configured to change the additional information associated with the selected content while the selected content is reproduced, and
wherein the additional information being changed is text which describes the selected content.

14. The content sharing terminal of claim 13, wherein the communication unit transmits a content sharing request to the one or more external devices and receives an acceptance message on the content sharing request from the one or more external devices.

15. The content sharing terminal of claim 14, wherein the controller selects at least one of an identification value of the one or more external devices and user account information of the one or more external devices, and
the communication unit transmits the content sharing request to the one or more external devices based on the selected at least one of the identification value of the one or more external devices and the user account information of the one or more external devices.

16. The content sharing terminal of claim 13, wherein the content includes at least one of content that has been already registered in a server and content that has been already stored in a memory of the content sharing terminal.

17. The content sharing terminal of claim 13, wherein the identification information of the selected content includes at least one of an index of the selected content and link information of the selected content.

18. The content sharing terminal of claim 13, wherein the content includes at least one of still image content, text content, video content, and music content.

19. The content sharing terminal of claim 13, content sharing method further comprising:
extracting a keyword from a communication between the content sharing terminal and the one or more external devices; and
recommending related content based on the extracted keyword,
wherein the controller extracts the keyword from the communication which is at least one of a voice call function, a video call function, and a chatting function.

20. The content sharing terminal of claim 13,
wherein the controller recommends additional related content of which a relationship with the selected content is equal to or greater than a predetermined criterion.

21. A content sharing terminal comprising:
a display providing states of a plurality of external devices;
a communication unit for transmitting identification information of a selected content to an external device which is selected among the plurality of external devices based on the states of the plurality of external devices, wherein the identification information of the selected content includes link information of the selected content;
a content reproducer for reproducing the selected content based on the identification information,
wherein the content reproducer displays additional information associated with the selected content,
wherein the communication unit transmits the additional information associated with the selected content to the one or more external devices,
wherein the additional information is changed by both the content sharing terminal and the one or more external devices while the selected content is reproduced, and
wherein the additional information being changed by the content sharing terminal and the one or more external devices is text which describes the selected content; and
a controller for controlling the communication unit and the content reproducer,
wherein the communication unit transmits a content sharing request to the one or more external devices and receives an acceptance message on the content sharing request from the one or more external devices, and wherein the selected content is transmitted to the content sharing terminal and the one or more external devices from a server which corresponds to the link information of the selected content.

22. The content sharing terminal of claim 21, wherein the content reproducer stops reproducing a first content and reproduces a second content when the content reproduced using the one or more external devices are changed from the first content to the second content.

23. The content sharing terminal of claim 21, wherein the selected content includes at least one of still image content, text content, video content, and music content.

* * * * *